L. TAVERDON.
Process for Mounting Diamonds.
No. 215,840. Patented May 27, 1879.
Fig. 1.
Fig. 2.
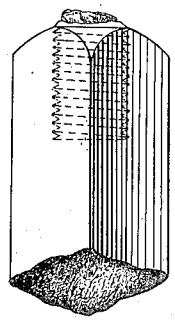
Fig. 3.
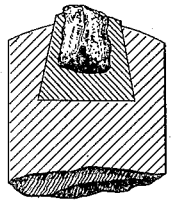
Fig. 4.
Fig. 5.
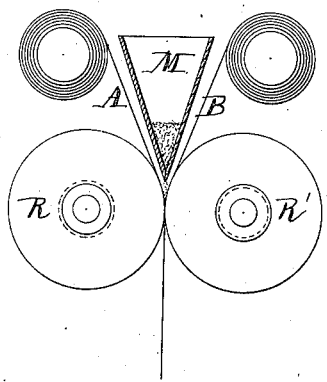
Fig. 6.
Ludovic Taverdon
by
A. Pollok
his attorney
witnesses
C. J. Hedrick
John T. Johnson

UNITED STATES PATENT OFFICE.

LUDOVIC TAVERDON, OF PARIS, FRANCE.

IMPROVEMENT IN PROCESSES FOR MOUNTING DIAMONDS.

Specification forming part of Letters Patent No. 215,840, dated May 27, 1879; application filed October 14, 1878.

*To all whom it may concern:*

Be it known that I, LUDOVIC TAVERDON, of Paris, in the Republic of France, have invented a new and useful Process for Mounting Diamonds and Hard Materials Suitable for Drills and Cutters, which process is fully set forth in the following specification.

Heretofore, in the mounting of diamonds or other hard bodies for drilling and similar purposes, the methods ordinarily employed consist in fitting the diamond proper, at the end of the perforating-tool, in soldering or inclosing it thereat by beating down about it the surrounding metal, or in adjusting it in a dovetail groove, or by other suitable means, whether the diamond be in the form of a single piece or of several pieces placed together back to back.

In this invention the means employed are very different from the above, both with regard to single pieces, which preparatory to mounting are inclosed in a setting, and also in regard to small pieces, fragments, or even powders, which are agglomerated before or at the time of mounting.

The following description will enable those skilled in the art to make and use my invention, reference being had to the accompanying drawings, in which—

Figures 1, 2, 3, 4 illustrate the setting and mounting of single pieces of diamond. Fig. 5 represents apparatus for inclosing diamond-sand in a metallic envelope, and Fig. 6 is a view of a portion of a metallic strip with diamond-sand at one end.

To prevent the diamond from working loose, becoming unseated, or dropping out of the tool, each piece is inclosed with a setting or envelope. This setting may be made of two pieces, first prepared to receive the diamond between them, and then united by soldering or brazing, turned, and screw-threaded for mounting; or the setting may be made of one piece to inclose entirely the diamond, like the shell of a nut incloses its kernel.

In the case of a setting made of two pieces, I proceed as follows: I take two plates of metal—of copper, for example—and on each, previously dressed, I imprint by pressure, aided, if necessary, by a blow, the half of the diamond or carbon to be mounted. In the lower part of Fig. 4 is a view, in longitudinal section, of a plate so prepared.

When the fitting of the diamond is thus well accomplished I solder the two plates together, turn the block thus obtained slightly conical, and cut on its surface a screw-thread, as represented in the upper portion of Fig. 4.

Instead of making the setting in two pieces, I sometimes make it of one piece, screw-threaded externally, and inclose in a suitable recess therein a splinter or piece of diamond by means of melted metal or similar material, as represented in Fig. 1.

In order to secure the screw-threaded setting in position, the head of the tool, prepared with an internally screw-threaded hole, is heated by plunging it into boiling water, and while the hole is enlarged on account of the heat the setting is screwed into place, so that when the tool-head becomes cold it is held tightly.

In case of a solid setting, enveloping entirely the carbon or diamond, I may make use of galvanoplasty, to deposit thereupon a metallic covering of such a thickness and form as required. I thus obtain a kind of metallic egg-shaped nut enlarged at the base, which I can then turn, thread and screw into, or solder or braze upon the mounting or drill-head, after which the interior kernel, diamond, or other hard body, when put into action and its edge exposed, can perform its cutting action.

The metallic nut or setting may be mounted instead of by a screw-thread by means of a dovetail groove or undercut recess, as shown in Fig. 3.

If, in order to utilize the small fragments of carbon or dust, it is desired to form a thin saw for cutting slabs of malachite or for other applications in the arts, instead of fitting in holes or adjusting the same in a dovetail groove, I proceed as follows: Between two rollers, R R', (see Fig. 5,) heated to redness by a jet of gas, or by other suitable means, I pass two thin ribbons, A B, coated with resin on the inside. In the angle formed by these two ribbons I dispose a small hopper, M, furnished with a sufficiently regular supply of carbon or diamond sand or dust. This hopper, which has a narrow open bottom, distributes the diamond-sand properly between the two ribbons on their interior faces, on which the little carbons become incrusted in consequence of the high temperature. They finally pass out from the rolls entirely imprisoned between two thin strips or shells very close to each other. It is not necessary that the two shells be of the same quality of metal, and, moreover, the carbon or diamond sand might be mixed with bronze-powder and pulverized borax, for the purpose of forming melting and agglomerating material.

An analogous result may be obtained by proceeding as follows: A metallic ribbon of a certain length, and of a width proportionately greater, is folded upon itself in the form of a letter U, and I place therein, with or without pulverized borax and bronze, the carbon-sand. I then run the ribbon thus bent and prepared between two cylinders heated as before described, but which are placed vertically.

I may here remark that I can envelop a piece of diamond by pouring over it melted metal, and in like manner that I can produce thereover a coating by amalgam by evaporating the mercury or other solvent after the amalgam has been prepared and the pieces of carbon or black diamond have been plunged therein and held by fine threads or otherwise.

In enveloping the pieces of carbon or carbon or diamond sand with a metallic covering of variable thickness, whether by galvanoplasty, by amalgam, or by agglomerating metallic salts, I have been able to produce artificially in each kind agglomerated black diamonds of all forms and dimensions. These agglomerations of very hard particles, which are only inconvenient on account of their extreme smallness, can be utilized by mounting them directly on the tool, as before described, or as kernels which are inclosed in a new setting. They may be used as burrs or disks, and are able to readily attack the very hardest tempered steel.

The means which I have just described in the same manner that they are applied to the mounting and agglomeration of pieces, splinters, or dust of black diamonds are also applicable to all other kinds of hard bodies, such as tempered or compressed glass, silex, corundum, steel bronze, or simple steel, &c.

It is evident that the metallic ribbon inclosing the carbon-sand may be inclosed in a setting or mounting in the manner before described with reference to a single diamond, the ribbon being wound upon itself or divided into pieces.

Having thus described my invention, and the manner in which the same is or may be carried into effect, what I claim, and desire to secure by Letters Patent, is—

1. The method of mounting and securing diamonds in drills or other tools, the same consisting in first inclosing the diamond with a metallic setting or envelope, and then preparing and fixing the said setting or envelope in the drill-head or other tool by suitable means, such as a screw-thread or dovetail, substantially as described.

2. The method of mounting and securing diamonds in drills and other tools, the same consisting in inclosing the diamond with a metallic setting or envelope, forming a screw-thread on the outside of said envelope, forming in the drill-head an internally screw-threaded socket, heating the drill-head, and, while hot, securing the diamond and its envelope in the socket therein, substantially as described.

3. The method of inclosing the diamond with a metallic setting or envelope adapted to be inserted in a suitably-shaped socket in a drill or other tool, the same consisting in inclosing the diamond between two plates fitting around it, and uniting them by soldering or brazing, substantially as described.

4. The method of inclosing or enveloping diamond powder or sand for the purpose specified, the same consisting in delivering it at the angle between metallic ribbons as they are passed between heated cylinders, substantially as described.

5. The method of mounting drills and other tools with diamonds, the same consisting in agglomerating, by the means described, diamond sand or powder, and inclosing the agglomerated mass in a metallic envelope or setting adapted to be inserted in a suitable socket, substantially as described.

6. The new article consisting of a metallic setting or envelope inclosing a diamond, the said setting being adapted for insertion in a suitably-shaped socket in a drill or other tool, substantially as described.

7. A metallic mounting or envelope externally screw-threaded and inclosing a diamond or agglomeration of diamond-sand, substantially as described.

8. A metallic ribbon inclosing diamond-sand between the laminæ, substantially as described.

9. A drill or similar tool armed with a diamond inclosed in a metallic setting and fixed in a socket by a screw-thread, substantially as described.

LUDOVIC TAVERDON.

Witnesses:
D. O. CASALONGO,
J. ZUCHETTI.